US012688606B2

(12) United States Patent
Vircikova et al.

(10) Patent No.: US 12,688,606 B2
(45) Date of Patent: Jul. 21, 2026

(54) METHOD, SYSTEM, AND MEDIUM FOR ARRANGING VIRTUAL POSITIONS OF PARTICIPANTS DURING ELECTRONIC COMMUNICATION

(71) Applicant: MATSUKO s.r.o., Košice (SK)

(72) Inventors: Mária Vircikova, Košice (SK); Matúš Kirchmayer, Košice (SK); Rudolf Jakša, Košice (SK)

(73) Assignee: MATSUKO S.R.O., Košice (SK)

( * ) Notice: Subject to any disclaimer, the term of this patent is extended or adjusted under 35 U.S.C. 154(b) by 346 days.

(21) Appl. No.: 18/224,545

(22) Filed: Jul. 20, 2023

(65) Prior Publication Data

US 2025/0029273 A1 Jan. 23, 2025

(51) Int. Cl.
*G06T 7/73* (2017.01)
*G06T 15/04* (2011.01)
*G06T 19/20* (2011.01)

(52) U.S. Cl.
CPC ............... *G06T 7/73* (2017.01); *G06T 15/04* (2013.01); *G06T 19/20* (2013.01); *G06T 2207/10016* (2013.01); *G06T 2219/2016* (2013.01)

(58) Field of Classification Search
CPC .......... G06T 7/73; G06T 15/04; G06T 19/20; G06T 2207/10016; G06T 2219/2016
See application file for complete search history.

(56) References Cited

U.S. PATENT DOCUMENTS

| | | | |
|---|---|---|---|
| 8,941,708 | B2 | 1/2015 | Skramstad |
| 10,321,093 | B2 | 6/2019 | Duckworth et al. |
| 10,491,643 | B2 | 11/2019 | Brown et al. |
| 11,589,184 | B1 | 2/2023 | Mont-Reynaud |

(Continued)

FOREIGN PATENT DOCUMENTS

| | | | | | |
|---|---|---|---|---|---|
| GB | | 2351216 A | * 12/2000 | ............. | G06T 13/40 |
| WO | WO-2018099990 A1 | * 6/2018 | ............. | H04N 7/157 |

OTHER PUBLICATIONS

Phillipi; "pix2pix"; https://github.com/phillipi/pix2pix; retrieved Jul. 20, 2023; 8 pgs.

(Continued)

*Primary Examiner* — Xin Sheng
(74) *Attorney, Agent, or Firm* — Tarolli, Sundheim, Covell & Tummino LLP

(57) ABSTRACT

A method and system for arranging virtual positions of participants during electronic communication is disclosed. Identifiers of a plurality of conference participants in a virtual conference are received, wherein at least a three-dimensional (3D) representation of the plurality of conference participants is to be displayed by a 3D display device for a selected one of the plurality of conference participants. Virtual positions of the plurality of conference participants are determined around a point for the selected participant. The determining comprises arranging the identifiers of the plurality of conference participants in an order around the point and determining the virtual positions of the remaining conference participants in the order. The virtual positions correspond to 3D representations of the remaining conference participants being within a field of view of the selected participant viewing with the 3D display device.

18 Claims, 9 Drawing Sheets

600

Receive identifiers of participants in a virtual conference — 601

Arrange the identifiers of the participants in an order around a point — 602

Determine the virtual positions of the remaining participants in the order, with 3D representations being within a field of view of the selected participant viewing with the 3D display — 603

(56) References Cited

U.S. PATENT DOCUMENTS

| | | |
|---|---|---|
| 2007/0291108 A1 | 12/2007 | Huber et al. |
| 2013/0106988 A1 | 5/2013 | Davis et al. |
| 2015/0163454 A1* | 6/2015 | Smith .................. H04N 13/243 |
| | | 348/14.07 |
| 2024/0290041 A1* | 8/2024 | Bove, Jr. ................. G06F 3/011 |

OTHER PUBLICATIONS

TensorFlow; "tf.keras.applications.resnet50.ResNet50"; https://www.tensorflow.org/api_docs/python/tf/keras/applications/resnet50/ResNet50; retrieved Jul. 20, 2023; 3 pgs.

Wikipedia the Free Encyclopedia; "Autoencoder"; https://en.wikipedia.org/wiki/Autoencoder; retrieved Jul. 20, 2023; 14 pgs.

Wikipedia the Free Encyclopedia; "ImageNet"; https://en.wikipedia.org/wiki/ImageNet; retrieved on Jul. 20, 2023; 5 pgs.

Wikipedia the Free Encyclopedia; "Principal component analysis"; https://en.wikipedia.org/wiki/Principal_component_analysis; retrieved Jul. 20, 2023; 34 pgs.

Wikipedia the Free Encyclopedia; "Residual neural network"; https://en.wikipedia.org/wiki/Residual_neural_network; retrieved on Jul. 20, 2023; 7 pgs.

Wikipedia the Free Encyclopedia; "k-means clustering"; https://en.wikipedia.org/wiki/K-means_clustering; retrieved Jul. 20, 2023; 17 pgs.

Wikipedia the Free Encyclopedia; "Travelling salesman problem"; https://en.wikipedia.org/wiki/Travelling_salesman_problem; retrieved Jul. 20, 2023; 21 pgs.

GitHub; "fillipe-gsm/python-tsp"; https://github.com/fillipe-gsm/python-tsp; retrieved Jul. 20, 2023; 19 pgs.

* cited by examiner

600

METHOD, SYSTEM, AND MEDIUM FOR ARRANGING VIRTUAL POSITIONS OF PARTICIPANTS DURING ELECTRONIC COMMUNICATION

TECHNICAL FIELD

The present disclosure is directed at methods, systems, and techniques for arranging virtual positions of participants during electronic communication.

BACKGROUND

In recent years, the application of technology in the field of communications has grown exponentially, especially with the advent and integration of holographic telecommunications. As the world moves toward more immersive and dynamic modes of communication, several pain points have emerged that challenge the effective application of this technology. Traditional grid and linear layouts used in videoconferencing or tele-meetings do not provide comfortable eye contact for holograms, making the experience less than ideal. In addition, these layouts are ill-equipped to handle conversations in three-dimensional (3D) environments, often resulting in discomfort and disorientation. Even attempts to implement arbitrary 3D layouts are hampered by poor participant visibility in augmented reality (AR) contexts. The existing practice of manually setting up participant positions often results in poor visibility and is impractical for quickly initiated conversations.

These concerns highlight the need for an innovative solution that not only addresses these limitations, but also enhances the user experience.

SUMMARY

According to a first aspect, there is provided a method comprising: receiving identifiers of a plurality of conference participants in a virtual conference, wherein at least a three-dimensional (3D) representation of the plurality of conference participants is to be displayed by a 3D display device for one of the plurality of conference participants; determining, for the one of the plurality of conference participants, virtual positions of the plurality of conference participants around a point. The determining comprises arranging the identifiers of the plurality of conference participants in an order around the point; and determining the virtual positions of the remaining conference participants in the order, wherein the virtual positions correspond to 3D representations of the remaining conference participants being within a field of view of the one of the plurality of conference participants viewing with the 3D display device.

In some embodiments, the method may further comprise providing the virtual positions of the remaining conference participants to a display unit of the 3D display device used by the one of the plurality of conference participants for display.

In some embodiments, the order may be common to all of the plurality of conference participants.

In some embodiments, an angle formed by the virtual position of a first one of the remaining conference participants based on the order, the virtual position of the one of the plurality of conference participants, and the virtual position of a last one of the remaining conference participants based on the order may be equal to or less than 50 degrees, for instance.

In some embodiments, the virtual positions of the remaining conference participants may be determined at substantially equal angular differences with respect to the point.

In some embodiments, the virtual positions of the plurality of conference participants are determined at substantially equal distances with respect to the point. Additionally or optionally, the method may further comprise determining the substantially equal distances based on sizes of the 3D representations of the remaining conference participants to avoid overlapping of the 3D representations.

In some embodiments, the method may further comprise: inserting a new conference participant who has joined the virtual conference in the order; and rearranging the virtual positions of the remaining conference participants, such that the virtual positions of the new conference participant and the remaining conference participants are spaced at substantially equal angular differences with respect to the point.

In some embodiments, the method may further comprise: removing a quitting conference participant who has left the virtual conference from the order; and updating the virtual positions of the remaining conference participants, such that the virtual positions of the remaining conference participants are spaced at substantially equal angular differences with respect to the point.

In some embodiments, the method may further comprise: generating a size and a position of a virtual surface allowing the virtual positions of the plurality of conference participants to surround a periphery of the virtual surface; and providing the size and the position of the virtual surface to a display unit of the 3D display device, by which the virtual surface is displayed with the 3D representations of the remaining conference participants surrounding the virtual surface.

In some embodiments, the method may further comprise: for the one of the plurality of conference participants, orienting the 3D representations of the remaining conference participants toward the center point; and providing orientations of the 3D representations of the remaining conference participants to a display unit of the 3D display device.

In some embodiments, the plurality of conference participants may comprise more than three conference participants, and the arranging may further comprise shifting the virtual positions of the remaining conference participants by reducing angular differences between the virtual positions of the remaining conference participants with respect to the point. Additionally or optionally, the virtual positions of the remaining conference participants may be shifted toward a region opposite to the virtual position of the one of the plurality of conference participants with respect to the point or toward the virtual position of an interactive conference participant having eye contact with the one of the plurality of conference participants.

In some embodiments, the 3D representations of the remaining conference participants may be pre-recorded, and the virtual positions of the remaining conference participants are determined according to similarities of the 3D representations of the remaining conference participants.

In some embodiments, the method may further comprise: clustering a historical collection of the plurality of conference participants by a clustering algorithm; determining the virtual positions of the historical collection of the plurality of conference participants, such that the virtual positions of the conference participants in a same cluster are within a predefined area; and providing the virtual positions of the historical collection of the plurality of conference participants to a display unit of the 3D display device used by the one of the plurality of conference participants for display.

In some embodiments, the 3D display device may be one of an augmented reality (AR) device, a virtual reality (VR) device, a volumetric display device, a holographic projection device, or a light field display device.

According to another aspect, there is provided a system comprising: at least one network interface; at least one processor communicatively coupled to the network interface; and at least one non-transitory computer readable medium communicatively coupled to the at least one processor and having stored thereon computer program code that is executable by the processor and that, when executed by the at least one processor, causes the at least one processor to perform the aforementioned method.

The system may further comprise a camera communicatively coupled to the processor, the camera for capturing an image of the conference participant.

The system may further comprise a display device communicatively coupled to the processor, and the method may further comprise displaying the reconstructed three-dimensional representation on the display.

According to another aspect, there is provided at least one non-transitory computer readable medium having encoded thereon computer program code that is executable by at least one processor and that, when executed by the at least one processor, causes the at least one processor to perform the aforementioned method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
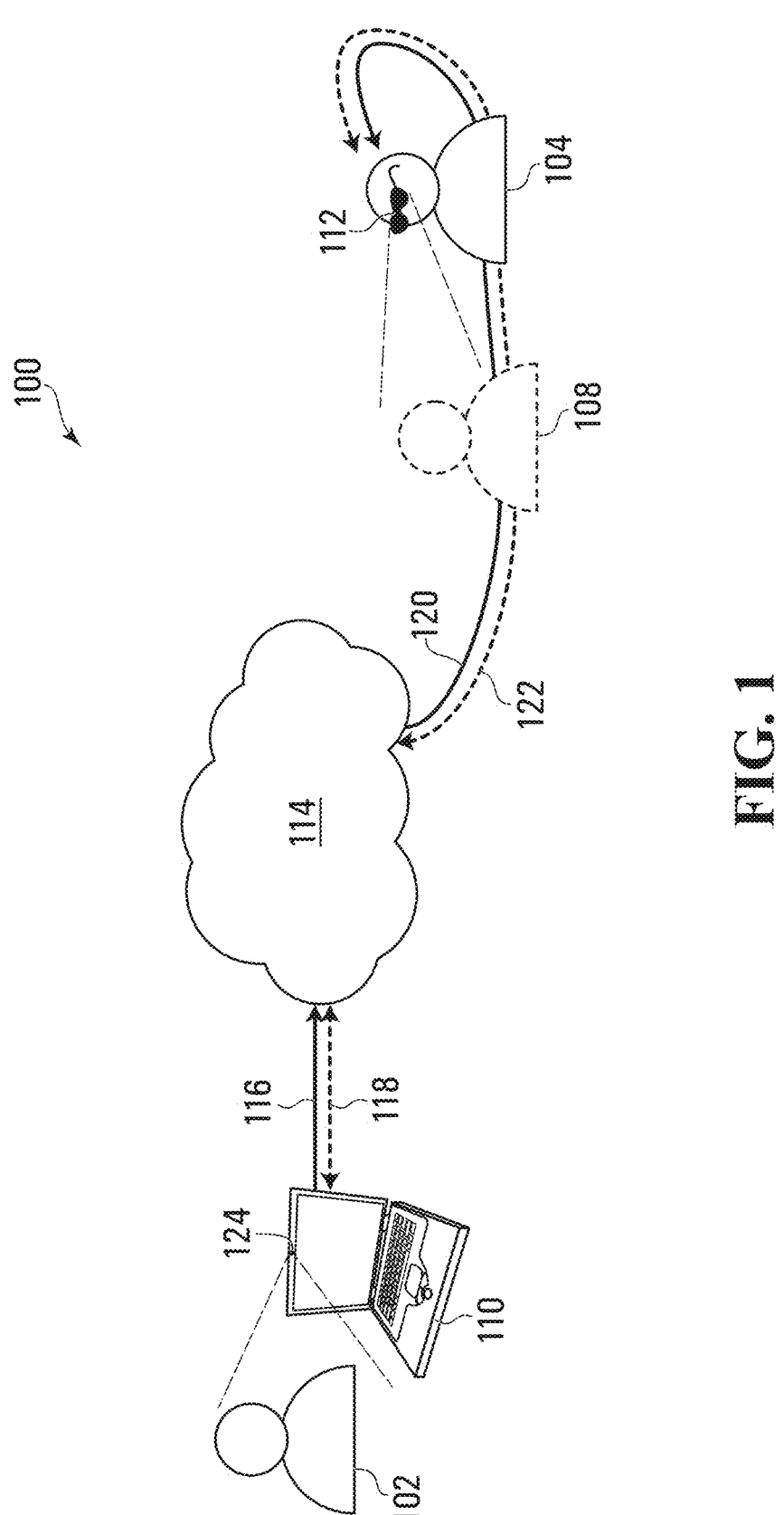
FIGS. 1 and 2 depict a system for three-dimensional electronic communication in which two parties are communicating with each other, according to an example embodiment.

Two-dimensional ("2D") communication, such as conventional videoconferencing, involves capturing a 2D video stream using a camera of a first conference participant, transmitting that data to a second conference participant, and then displaying that video stream on a display of the second conference participant. While an improvement over a phone conversation, 2D videoconferencing nonetheless falls well short of replicating the immersion and non-verbal communication possible during an in-person conversation. One way in which to improve upon 2D communication in this regard is to adopt communication that expresses depth: this may be 2.5-dimensional ("2.5D") or three-dimensional ("3D").

While traditional 3D communication involves the use of animated avatars to represent conference participants, this method often emphasizes the computer-animated nature of the avatars, thereby compromising the element of realistic, in-person communication. Holographic calls, on the other hand, use 3D holograms of participants projected onto 3D display devices such as headsets and dedicated displays. These holographic representations are placed in 3D space, introducing a level of complexity not found in traditional 2D video calls.

The arrangement and positioning of the participants within this 3D space presents unique challenges that do not have obvious solutions. Current positioning methods, such as grid and linear layouts that work effectively for traditional calls, fall short of providing an optimal experience for holographic calls. In addition, recent innovations such as virtual reality (VR) office applications offer features such as manual participant positioning or automatic positioning around arbitrarily designed tables. However, these features may not adequately address the needs of holographic calls, which require an automated system for quickly positioning participants while carefully managing eye contact and VR display devices. In addition, in an augmented reality (AR) environment, arbitrary table positioning schemes often result in visual conflicts with the real-world environment, causing disruptions to the user experience.

As used herein, the following terms have the following meanings:

2D Data: Data depicting a 2D image, such as a bitmap, JPEG, or PNG image. 2D data includes data depicting still images, and data comprising part of a video stream depicting multiple 2D images. 2D data may include raster and vector images.

2.5D Data: 2D data that includes a depth map. For example, while 2D data may comprise RGB channels, analogous 2.5D data would comprise RGBD channels. In at least some embodiments, a 3D image with one or more holes is a 2.5D image.

3D capable display device: A display device that can display a 3D object to a conference participant. Examples of 3D capable display devices comprise headsets; 3D televisions and monitors; holographic projectors; and a rendering or projection of 3D data on a classical 2D display.

3D Data: Data representing a 3D model. Examples of 3D data include voxels, depth map data, point-cloud data, and mesh data. 3D data includes data depicting a still 3D model, and a stream of data depicting a 3D model in motion. 3D data may be acquired, for example, using specialized 3D scanning hardware. Examples of suitable scanning hardware comprise "The Relightables" volumetric capture system by Google™ AI or the capture system used by Facebook™ Reality Labs. "Full-featured" 3D data of a body part herein refers to 3D data covering depicting the entirety of that body part, without gaps in the data. For example, full-featured 3D data of a person's head represents a 3D model of the head showing hair on the top of the head plus a 360 degree view around the front, sides, and back of the head.

Artificial neural network: Also referred to simply as a "neural network" herein, a type of data processing system that relies on machine learning to become suitably configured to perform a particular task. Neural networks are capable of performing massively parametric nonlinear extrapolation. Examples of neural networks that may be used in at least some of the embodiments herein are CNNs and multilayer perceptron ("MLP") neural networks.

Convolutional neural network, or CNN: A type of artificial neural network configured particularly for image processing.

Headset: Wearable glasses permitting display of 3D objects to a wearer. Example headsets comprise virtual reality ("VR"), augmented reality ("AR"), and mixed reality ("MR") headsets.

Peer-to-peer ("P2P") communication: Communication between two endpoints in which data is not routed through a central server, but directly between the two endpoints.

Photo-realistic image: An image (whether 2D or 3D, and whether standalone or as part of a video) generated by data resulting from light captured on a sensor and displayed as a matrix of intensities of light and optionally color on particular locations in a raster, and images analogous thereto and/or resulting from a transformation thereof. In contrast to an avatar-based representation of a face in which only certain face landmarks are selected and mapped to an animated avatar, photo-realistic 3D video in at least some embodiments is generated not by using face landmarks as in an avatar-based approach, but from a transformation of 2D or 2.5D input video. For example, a 3D reconstruction of a head may be generated by transforming all 2D video of the head captured by a camera using an artificial neural network, as opposed to simply selecting certain facial landmarks on the head and mapping those facial landmarks to an avatar to morph the avatar.

Real-time video processing: Processing of an input video stream such that the output video stream resulting from the processing is provided at almost the same time as the input (e.g. a latency of no more than 500 ms) and at a suitable frame rate (e.g. at least 15 fps) as the input video stream.

Referring now to FIG. 1, there is depicted a system 100 for 3D electronic communication, according to an example embodiment. In at least some of the example embodiments described below, the type of 3D electronic communication is holographic communication, as is possible using certain types of headsets (e.g. Microsoft™ HoloLens™). In at least some other example embodiments, the type of 3D electronic communication may comprise, for example, displaying a 3D representation of one of the conference participants on to the 2D screen of another of the conference participants.

The system 100 of FIG. 1 is being used by a first conference participant 102 and a second conference participant 104. In FIG. 1, a first video acquisition device 110, such as a personal computer, comprising a camera 124 captures a 2D video stream of the first participant 102. The first video acquisition device 110 is networked to cloud infrastructure 114, comprising one or more servers. The cloud infrastructure 114 receives the 2D video stream from the first video acquisition device 110 and applies an artificial neural network to process it such that the artificial neural network outputs data enabling reconstruction of a photo-realistic, 2.5-dimensional or three-dimensional representation of the first participant's 102 head. In particular, the artificial neural network reconstructs the portions of the first participant's 102 head not depicted in the 2D image data captured by the camera 124 on the first video acquisition device 110 in 3D. For example, the artificial neural network in at least some example embodiments outputs data enabling reconstruction of a 360 degree view of the first participant's 102 head, even if the camera 124 only captures a front elevation view of the first participant's 102 face. In at least some example embodiments the system 100 may also image other parts of the first participant's 102 head (e.g. the sides, back, and/or top of the head), and other parts of the first participant's 102 body (e.g. the neck and shoulders).

The output of the artificial neural network is sent to the first display device 112; in FIG. 1, the first display device 112 is a headset worn by the second participant 104. The first display device 112 receives the data output of the artificial neural network from the cloud infrastructure 114 and projects a holographic projection 108 of the first participant 102 for viewing by the second participant 104.

Communication between the first video acquisition device 110 and the cloud infrastructure 114 is performed via the first video data stream 116 and the first management data stream 118, while communication between the cloud infrastructure 114 and the first display device 112 is analogously performed via the second data stream 120 and the second management data stream 122. The contents of the various data streams 116, 118, 120, 122 are described further below.

Each of the first video acquisition device 110, first display device 112, and one or more servers comprising the cloud infrastructure 114, comprises at least one processor communicatively coupled to a computer memory that has stored on it computer program code executable by that at least one processor such that, when that at least one processor executes that computer program code, the system 100 collectively performs the functionality described herein. This implementation includes, for example, execution by a neural or artificial intelligence accelerator. More particularly, the system 100 collectively implements the actions and subsystems described below.

The first video acquisition device 110 comprises an input processing subsystem, which itself comprises a data access subsystem, a preprocessing subsystem, and a stream sender subsystem. The data access subsystem reads the 2D video stream from the camera 124 and relays the 2D video stream to the preprocessing subsystem. The preprocessing subsystem re-scales, synchronizes, and de-noises the 2D video stream. The stream sender subsystem forms the first video data stream 116 and sends the first video data stream 116 to the cloud infrastructure 114. The first video data stream 116 comprises the following channels:

an audio channel, comprising sound data obtained using the first computer's 110 microphone;

a video channel, comprising the 2D video stream; and a metadata channel, comprising additional data related to the electronic communication such as head position and head rotation data.

In at least some other embodiments in which the first video acquisition device 110 also captures depth data (e.g. using a depth sensor or stereo camera), the first video data stream 116 may also comprise a depth data channel for transmitting that depth data. More generally herein, 2D video data may be replaced with 2.5D video data unless otherwise indicated to create additional embodiments.

While the first video data stream 116 comprises substantive content used to create the holographic projection 108, the first management data stream 118 is used for call management communications. For example, data comprising part of the first management data stream 118 is used to negotiate, initiate, and end the communication, and also for setup and synchronization purposes.

The cloud infrastructure 114 performs various actions on the first and second data streams 116, 118. More particularly, the cloud infrastructure 114 receives the first and second data streams 116, 118; performs call management, including authentication and configuration of the call; performs 2D-to-3D (or 2.5D-to-3D, as referenced above) reconstruction of the first participant 102; and outputs the data suitable for 3D displaying of the first participant 102 ("3D data") to the first display device 112.

Using the system 100 of FIG. 1, the holographic projection 108 is in at least some example embodiments photo-realistic. Photo-realism is facilitated by using a 2D or 2.5D-to-3D reconstruction method based on translating pixels to voxels or a depth map as opposed to an avatar-based approach in which facial expressions are represented as feature vectors of using selected face landmarks.

Figure 2:
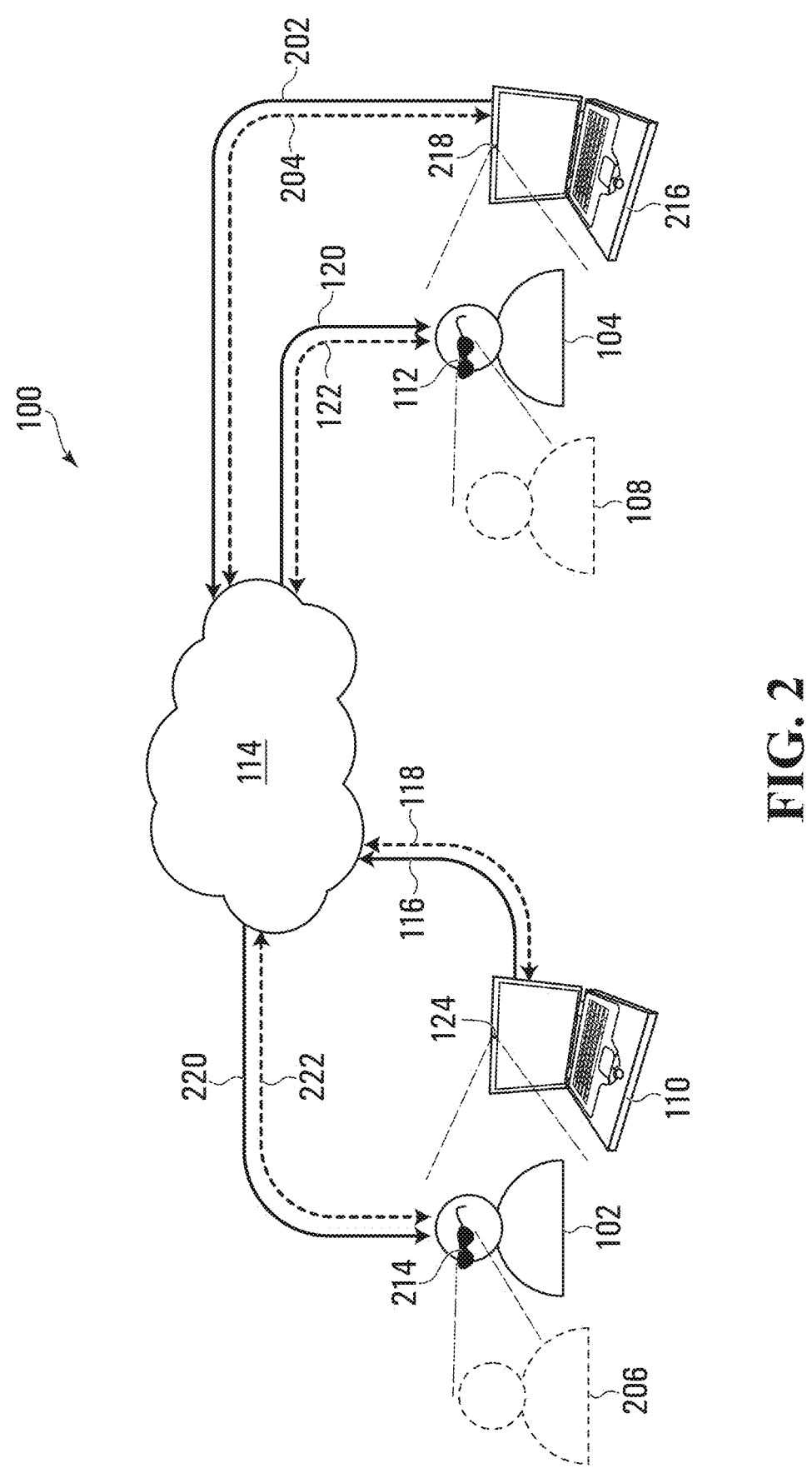

Referring now to FIG. 2, another example embodiment of the system 100 for 3D electronic communication is depicted. While the system 100 of FIG. 1 permits one-way holographic communication from the first participant 102 to the second participant 104, the system 100 of FIG. 2 permits bi-directional holographic communication. While the system 100 of FIG. 1 implements a "one way" call from the first participant 102 to the second participant 104, the system 100 of FIG. 2 accordingly performs bi-directional electronic communication by implementing two one-way calls in parallel with each other. This is done by essentially duplicating the equipment used for the one way call of FIG. 1, thereby enabling the first participant 102 to view a holographic projection 206 of the second participant 104.

More particularly, relative to FIG. 1, the system 100 of FIG. 2 further comprises a second video acquisition device 216 comprising a second camera 218, which captures 2D images of the second participant 104. Analogous to the first video acquisition device 110, the second video acquisition device 216 also comprises a data access subsystem, a preprocessing subsystem, and a stream sender subsystem. The second video acquisition device 216 transmits to the cloud infrastructure a third video data stream 202, analogous to the first video data stream 116 sent by the first video acquisition device 110, and bi-directionally communicates with a call management subsystem of the cloud infrastructure 114 using a third management data stream 204 that is analogous to the first management data stream 118 sent and received by the first video acquisition device 110.

The system 100 of FIG. 2 also comprises a second display device 214 worn by the first conference participant 102, with the second display device 214 projecting the holographic projection 206 of the second participant 104. The cloud infrastructure 114 transmits a third data stream 220, analogous to the second data stream 120, to the second display device 214. A third management data stream 222, analogous to the second management data stream 122, between the cloud infrastructure 114 and the second display device 214 is used for call management.

Figure 3:
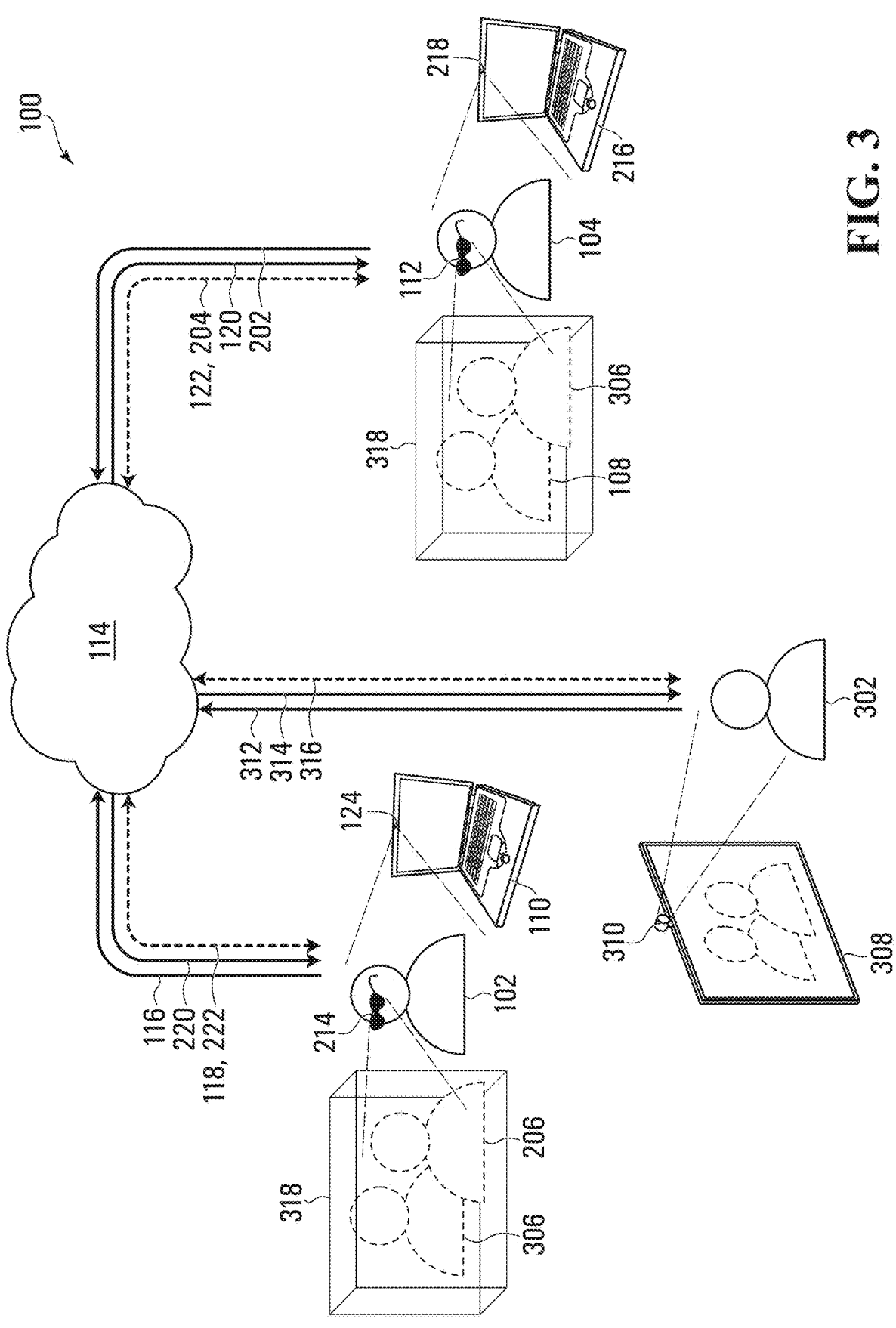
FIG. 3 depicts a system for three-dimensional electronic communication in which three parties are communicating with each other, according to another example embodiment.

FIG. 3 depicts another embodiment of the system 100 for 3D electronic communication in which a third conference participant 302 holographically conferences with the first and second participants 102, 104. Analogous to how the system 100 of FIG. 2 permits two-way communication by doubling the equipment used to implement the system 100 of FIG. 1, the system 100 of FIG. 3 enables three-way communication by tripling the equipment in the system 100 of FIG. 1. Relative to the system 100 of FIG. 2, the system 100 of FIG. 3 accordingly further comprises a third video acquisition device comprising a third camera 310 that captures a 2D video stream of the third participant 302. The third camera 310 transmits a fourth video data stream 312 to the cloud infrastructure 114 and receives a fourth management data stream 316 from the cloud infrastructure 114. The fourth video data stream 312 is analogous to the first and third video data streams 116, 202, and accordingly permits each of the first and second participants 102, 104 to view a holographic projection 306 of the third participant 302. The fifth data stream 314 is analogous to the second and third data streams 120, 220, and accordingly sends textured, 3D data to a third display device 308 in the form of a television that enables the third participant 302 to view 2.5D representations of the first and second participants 102, 104 on a screen. A fourth management data stream 316 collectively represents bi-directional data streams between each of the third video camera 310 and third display device 308 and the cloud infrastructure 114 for call management, and is analogous to the first and third management data streams 118, 222 in respect of the first participant 102 and to the second and third management data streams 122, 204 in respect of the second participant 104.

In contrast to the embodiments of FIGS. 1 and 2, in FIG. 3 each of the first and second participants 102, 104 views two of the holographic projections 108, 206, 306, while the third participant 302 views 2.5D representations based on 3D models of the first and second participants 102, 104. Consequently, the call management data also comprises spatial positioning of each of the projections 108, 206, 306 within the 3D virtual environments 318 of the first and second display devices 112, 214 and the representation of the 3D virtual environment 318 displayed on the third display device 308. The call management subsystem in the cloud infrastructure 114 maintains relative 3D positioning between the holographic projections 108, 206, 306 for each of the 3D virtual environments 318 of the first and second display devices 112, 214 and the representation of the 3D virtual environment 318 displayed on the third display device 308, and transmits that positioning to each of the first through third display devices 112, 214, 308 for their use during holographic projection (for the first and second display devices 112, 214) and 2.5D representation (for the third display device 308). A conference of more than three participants 102, 104, 304 may be organized analogously as shown in FIG. 3. More particularly, each of the fourth and subsequent participants may be treated analogously as any of the first through third participants 102, 104, 302.

Figure 4:
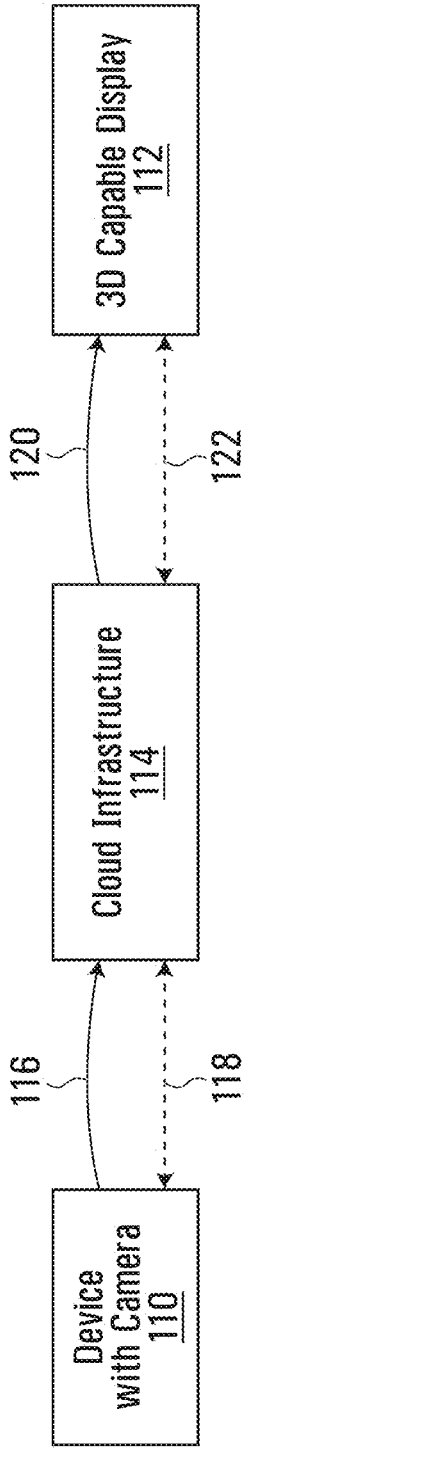
FIGS. 4 and 5 depict block diagrams of a system for three-dimensional electronic communication, according to additional example embodiments.

Referring now to FIG. 4, a block diagram of another embodiment of the system 100 for 3D electronic communication is shown. The system 100 of FIG. 4 comprises a device with a camera such as the first video acquisition device 110, the cloud infrastructure 114, and a 3D capable display such as the first display device 112. As discussed above, the first video data stream 116 transmits video data from the first video acquisition device 110 to the cloud infrastructure 114, the second data stream 120 transmits data from the cloud infrastructure 114 to the first display device 112, and the first and second management data streams 118, 122 bi-directionally transmit call management data between the first video acquisition device 110 and the cloud infrastructure 114, and between the cloud infrastructure 114 and the first display device 112.

The content of the data streams 116, 120 and the tasks performed by the first video acquisition device 110, cloud infrastructure 114, and first display device 112 may change, depending on the particular embodiment. For example, as described above in respect of the example embodiment of FIG. 1, the first video acquisition device 110 may comprise one or more of a data access subsystem, a preprocessing subsystem, or a stream sender subsystem; the cloud infrastructure 114 may comprise one or more of a call management subsystem, a stream receiver subsystem, a 2D-to-3D reconstruction subsystem, a texture reconstruction subsystem, a 3D processing subsystem, or a stream sender subsystem; and the first display device 112 may comprise one or more of a stream receiver subsystem, a 3D and texture processing subsystem, or a display subsystem. Consequently, the first video data stream 116 comprises 2D (or 2.5D) data, which the cloud infrastructure 114 processes into volumetric video data with color texture that is contained in the second data stream 120.

Figure 5:
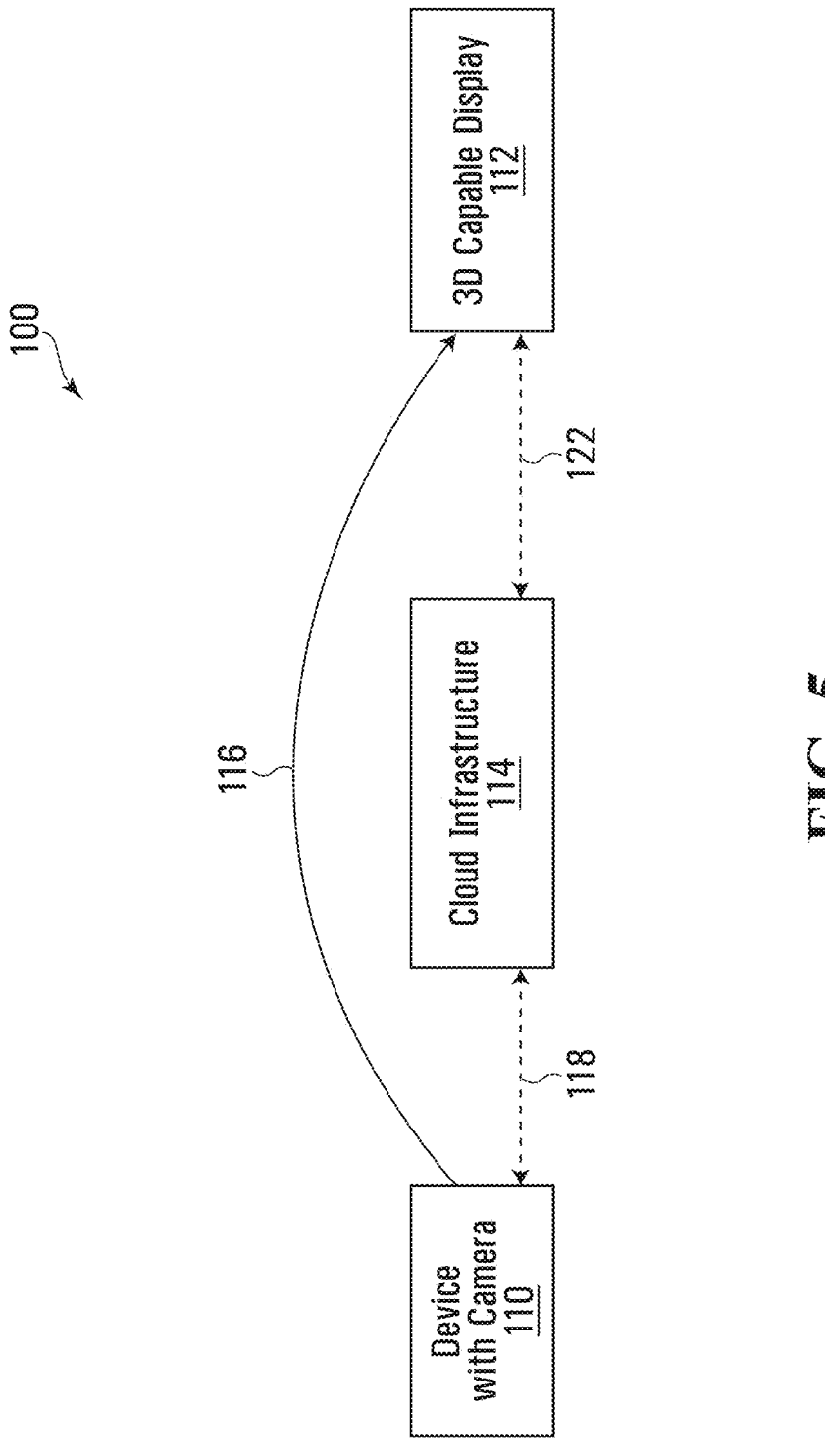

Referring now to FIG. 5, an embodiment of the system 100 in which the first video acquisition device 110 and the first display device 112 communicate on a peer-to-peer basis is shown. In this example embodiment, the cloud infrastructure 114 comprises a call management subsystem, and is functionally only responsible for call management as is indicated by the first management data stream 118 being bi-directionally transmitted between the first video acquisition device 110 and the cloud infrastructure 114, and the second management data stream 122 being bi-directionally transmitted between the cloud infrastructure 114 and the first display device 112. As the cloud infrastructure 114 is only responsible for call management, functionality otherwise performed by the cloud infrastructure 114 is shifted to one or both of the first video acquisition device 110 and the first display device 112.

For example, in at least some of the peer-to-peer embodiments, the first video acquisition device 110 may comprise one or more of a data access subsystem, a preprocessing subsystem, or a stream sender subsystem; and the first display device 112 may comprise one or more of a stream receiver subsystem, a preprocessing subsystem, a 2D-to-3D reconstruction subsystem, a texture reconstruction subsystem, a 3D processing subsystem, or a display subsystem. Consequently, the first video data stream 116 comprises 2D (or 2.5D) data, which is reconstructed as 3D data at the first display device 112.

Conversely, in at least some other peer-to-peer embodiments, the first display device 112 may comprise one or more of a stream receiver subsystem, a 3D and texture processing subsystem, or a display subsystem; and the first video acquisition device 110 may comprise one or more of a data access subsystem, a preprocessing subsystem, a 2D-to-3D reconstruction subsystem, a texture reconstruction subsystem, a 3D processing subsystem, or a stream sender subsystem. Consequently, the first data stream 116 comprises 3D data.

Virtual Position Arrangements

In a holographic teleconference, the role of virtual positioning of participants is paramount. Unlike traditional videoconferencing, where participants appear as two-dimensional images on a flat screen, holographic teleconferencing places each participant in a shared three-dimensional space. This immersive environment promotes more natural interactions and collaboration among participants. However, creating this enhanced communication environment requires careful consideration and precise management of participants' virtual positions.

Each participant in a holographic teleconference may be assigned a unique identity and a corresponding virtual position in 3D space. This position is not just a fixed point in the digital landscape, but rather an individualized platform that enhances the participant's ability to interact. It serves as an anchor point for each individual, defining their perspective of the 3D space and their interactions with remaining participants.

The arrangement of these virtual positions plays an important role in the overall user experience. A desirable arrangement would maximize the visibility of all participants, allowing them to have clear, unobstructed views of each other. It would also take into account the importance of maintaining eye contact, which is key to meaningful and effective communication. Therefore, it is advantageous to carefully design the layout and allow the virtual positions to be dynamically adjusted to accommodate varying numbers and orientations of participants. In this way, the holographic teleconferencing system can not only replicate the nuances of in-person interactions, but also overcome the spatial constraints of physical meetings. As a result, such a solution can redefine the boundaries of collaborative efforts, creating a more connected and engaging communication environment.

Virtual positions within a holographic teleconference go beyond the traditional concept of static seating and embrace an adaptable, dynamic nature facilitated by advanced technology. These positions can be designed in a variety of formats to meet the unique requirements of each meeting or event, the number of participants, and their spatial distribution. These positions are not simply fixed seats, but dynamic platforms that evolve with the conversation, increasing the depth and quality of participants' interactions.

Inspired by a variety of real-world meeting scenarios, participants' virtual positions may be arranged to reflect familiar arrangements. For example, an interactive conference may use a circular or semicircular arrangement that allows participants to see each other clearly, replicating the dynamics of a roundtable discussion. The immersive experience may be further enhanced by mimicking real-world environments such as boardrooms, classrooms, or auditoriums in virtual space. However, factors such as optimal viewing angles, technical limitations of the equipment, and maintaining realistic eye contact between participants are some main considerations in determining these virtual arrangements, which are discussed further below.

In addition to the positioning of participant representations, it may be desirable to provide flexibility in the choice of display backgrounds. Depending on specific requirements or preferences, the background may be a simple single color, such as black or any other color, or it may be a more elaborate image or three-dimensional scene. For an augmented reality setup, the user's real environment may be integrated as the background, blending the virtual participants harmoniously with the real environment. This dual emphasis on familiar virtual arrangements and adaptable background selection enhances the overall immersive experience and promotes a more engaging and efficient holographic telecommunication environment. In summary, the methods of arranging virtual positions of participants in 3D space according to the embodiments described herein provide an enhanced user experience, particularly when wearing a 3D holographic display.

Figure 6:
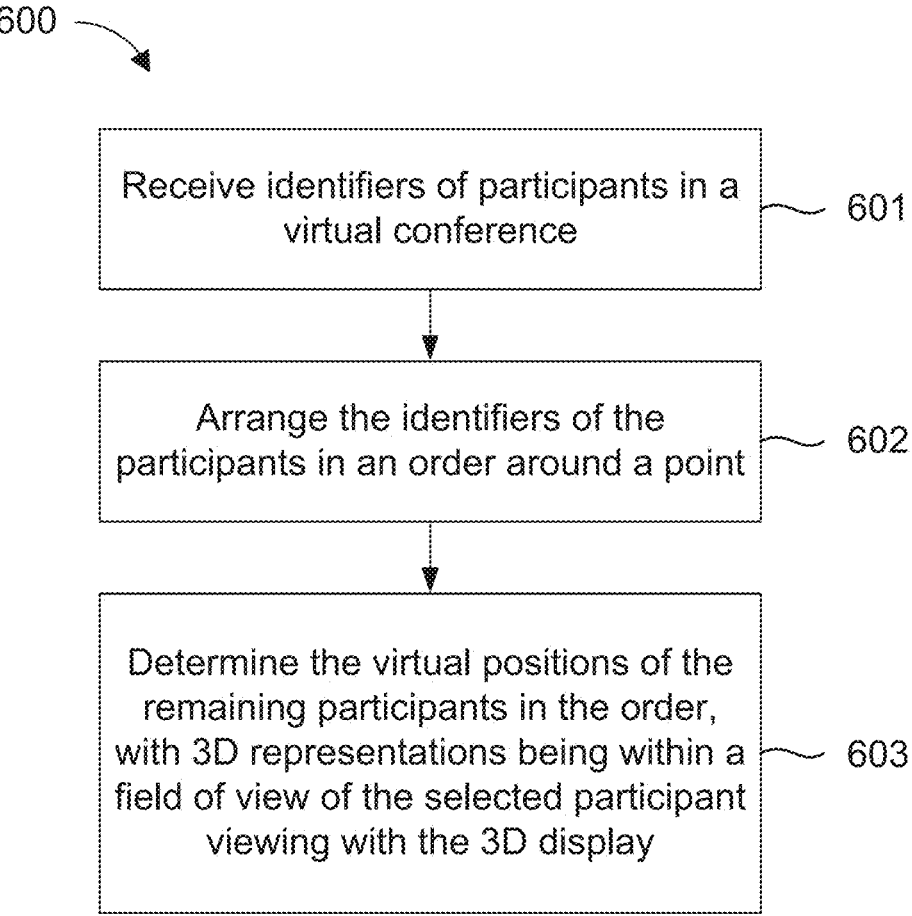
FIG. 6 illustrates a method of arranging virtual positions for conference participants according to an example embodiment.

Referring now to FIG. 6, an example embodiment of a method 600 for arranging virtual positions for conference participants is illustrated. The method 600 does not require much computing power, so it may be performed on any of the processing devices discussed above with respect to FIGS. 1-3, such as the cloud infrastructure 114, the first video acquisition device 110, the second video acquisition device 216, the first display device 112, the second display device 214, the third display device 308, or any other processing device in the same communication environment.

At step 601, identifiers of a plurality of conference participants in a virtual conference are received. At least a 3D representation of the plurality of conference participants is to be displayed by a 3D display device for one of the plurality of conference participants. The step 601 begins with receiving unique identifiers corresponding to the plurality of participants in a virtual conference. These identifiers may be different user names, individual user IDs, exclusive email addresses, or any other unique form of digital recognition associated with each participant. The 3D display device may be any of the display devices discussed above with respect to FIGS. 1-3, such as the first display device 112, the second display device 214, the third display device 308.

At step 602, the identifiers of the plurality of conference participants are arranged in an order around a point. The order may typically be a cyclic order. The term "cyclic order" here refers to an arrangement in which the sequence loops back to the beginning after reaching the last element, similar to a circular buffer in computer science or a round-robin scheduling algorithm. In this way, each participant has a left-side conference participant and a right-side conference participant. In the context of a virtual conference, this order can manifest itself in different ways, depending on the specifics of the situation. A simplistic interpretation may be that the identifiers of the participants are arranged according to the time they join the conference, effectively creating a loop that begins again with the first participant after the last has been accounted for. However, this order can also be derived from a more complex set of rules informed by the characteristics embedded in the identifiers themselves, such as by location, organization, rank, etc.

In some embodiments, the order may be common to all conference participants. Such a common order may significantly improve the direction of gaze or eye contact within the virtual conference. In a 3D virtual environment, the consistent directionality provided by a common order may help to mimic the natural eye movement found in face-to-face interactions. For example, if all participants share the same order, each participant will know where to look next to anticipate who might speak or respond, just as if they were sitting around a physical table. This may be beneficial during round-robin discussions or presentations where the turns are systematically rotated among participants. Alternatively, some participants may share a common order while others have a different order. This may be useful in cases where certain groups within the conference have a particular order of interaction or communication with each other, similar to departmental clusters in a company-wide meeting.

At step 603, the virtual positions of the remaining conference participants are determined in the order. the virtual positions correspond to 3D representations of the remaining conference participants being within a field of view of the one of the plurality of conference participants viewing with the 3D display device. This arrangement is specifically designed for a selected one of the conference participants with the goal of having the 3D representations of the remaining participants within the field of view of the 3D display device relative to the virtual position of this selected participant. This step essentially conceptualizes a virtual "round table" setting where participants are seated cyclically around the point. It ensures that the remaining participants' representations are within this participant's field of view, allowing for a more immersive and engaging experience by replicating the dynamics of a real meeting setup.

It should be appreciated that when the method 600 is applied to each of the plurality of conference participants, each participant may be able to have a more immersive and engaging experience by viewing most, if not all, of the participants while maintaining natural eye contact among the participants. This method is particularly applicable when there are many participants, such as more than three participants in the same conferencing session, because the horizontal field of view allowed by the 3D display device typically ranges from 40 to 90 degrees, and may be up to 115 degrees. In some embodiments, an angle formed by the virtual position of a first of the remaining conference participants based on the order, the virtual position of the selected one of the plurality of conference participants, and the virtual position of a last of the remaining conference participants based on the order may be equal to or less than 50 degrees, for instance. In this way, the angular difference between the first and the last of the remaining conference participants allows the remaining conference participants to be simultaneously viewed by the selected one of the plurality of conference participants, and the field of view is conveniently small, regardless of the 3D display device used by the selected participant, allowing for a more comfortable and natural communication.

In some embodiments, the method 600 may further comprise providing the virtual positions of the remaining conference participants to a display unit of the 3D display device being used for display by the selected participant. In doing so, the position information, essentially the coordinates of each participant's virtual position in the arrangement, is provided to the display unit of the selected participant's 3D display device. The 3D display device may be a headset or a dedicated 3D display as described above. For example, 3D renderings may be displayed on 2D devices, potentially utilizing the parallax effect to convey depth and perspective. Upon receiving the position information, the display unit then generates and displays the virtual conference environment, ensuring that the 3D representations of all other participants are within the field of view of the selected participant. This effectively places the selected participant at a reference position that can comfortably see the virtual positions of the remaining conference participants, allowing for easy and intuitive interaction with all other participants, similar to a physical table setup.

In some embodiments, the virtual positions of the remaining conference participants may be arranged at substantially equal angular differences with respect to the point. Thus, the virtual positions of the conference participants may be uniformly distributed along a periphery of a virtual table. Additionally, the virtual positions of the plurality of conference participants may be arranged at substantially equal distances with respect to the point. Thus, the virtual positions of the conference participants may be distributed on the same radius with respect to the point, forming a circle or a polygon (e.g., with each participant positioned at a corresponding vertex of the polygon).

The positioning strategy based on the embodiments described herein may additionally facilitate the inclusion of participants with oversized elements, such as a large hat or significant object, in the conference. For instance, the method 600 may further comprise determining the substantially equal distances based on the sizes of the 3D representations of the remaining conference participants. This is for the purpose of preventing any overlap between these representations, thereby maintaining clear visibility of each participant in the virtual conference. Consequently, if a participant's representation is unusually large or small, the radius of the virtual cyclic arrangement can be adaptively increased or decreased to accommodate this size variation. This ensures that no 3D representation intrudes into the space of an adjacent representation, thus preserving the distinctiveness of each participant in the view.

In some cases, holograms generated by conventional devices such as computer cameras, tablet cameras, or phone cameras lack complete information about the lower torso. The absence of this portion of the body representation can detract from the overall realism of the virtual environment. To address this, the virtual surface may be strategically displayed in the space between participants. Thus, in some embodiments, the method 600 may extend its functionality by generating the size and position of a virtual surface that allows the virtual positions of the conference participants to encircle its periphery. The size and position of this virtual surface are then provided to the display unit of the three-dimensional display device. This arrangement ensures that the selected participant will be able to view the 3D representations of the remaining conference participants as if they were surrounding the virtual surface. This serves a dual purpose—not only does it hide the missing body part, thereby enhancing the visual integrity of the participants' representations, but it also provides a tangible, familiar anchor in the virtual space, similar to a table in a physical meeting room. The inclusion of the virtual surface can cleverly combine the creation and positioning of a virtual surface with the arrangement of participants, resulting in an enhanced, more engaging virtual conferencing experience.

In some embodiments, the method 600 may further comprise, for one of the plurality of conference participants, orienting faces or heads of the 3D representations of the remaining conference participants toward the point. Orienting the participants' holograms orients their neutral head orientation, as provided by the holographic calling application, toward the point. This orientation facilitates a unified focus of the participants toward the point of the cyclic arrangement, analogous to how participants might focus on the center of a roundtable in a physical meeting setting. Participants can then begin to interact within the virtual meeting. Their eye contact within this space will appear natural and intuitive, closely mirroring real-life interactions. This is made possible by the system's ability to track and translate their eye and head movements in 3D space. As participants turn their heads or shift their gaze, these movements are reflected in their respective holographic representations, maintaining an authentic and dynamic interaction among all conference participants.

Figure 7:
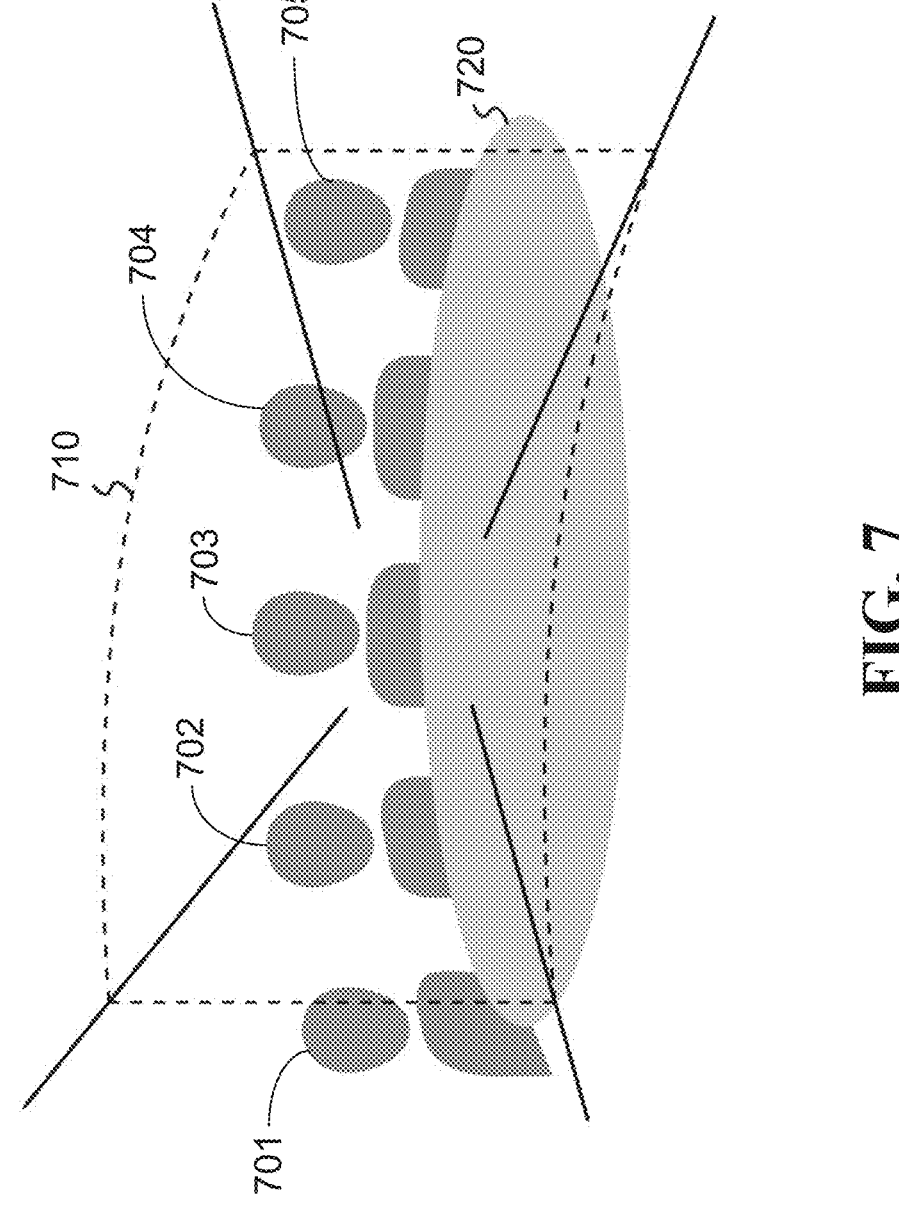
FIG. 7 depicts a circular positioning of conference participants according to an example embodiment.

Referring now to FIG. 7, an example scenario is illustrated in which a number of the 3D representations of the remaining conference participants are arranged around a center point. In this example, there are a total of six (6) conference participants, with one of the conference participants wearing a 3D display device. For the one participant wearing the 3D display device, the display unit of the 3D display device shows 3D representations of five (5) remaining conference participants 701, 702, 703, 704, 705. The five (5) remaining participants and the observing participants are arranged in an order so that the virtual position of each participant has both a left and a right neighboring participant. The 3D display device has a field of view 710 so that the observing participant can view a scene in which the remaining participants are arranged around the center point and are within the field of view 710. The virtual positions of the remaining participants are arranged so that they can be viewed simultaneously by the 3D display device. However, in this example, when the 3D display device is a wearable goggle, the field of view 710 moves as the observing conference participant shakes his/her head, and thus a portion of the 3D representation may be moved out of the field of view 710, as shown by the leftmost conference participant 701 in FIG. 7. Additionally, a virtual table 720 may be displayed for covering lower bodies of the 3D representations of the remaining conference participants 701, 702, 703, 704, 705.

In some embodiments, arranging the virtual positions of the conference participants may comprise arranging the virtual positions of all conference participants uniformly around the center point and then shifting the virtual positions of the remaining conference participants to fit into the field of view of the 3D display device used by the observing participant. This may be illustrated by FIG. 8, which shows the arranging and shifting processes with respect to different observing participants.

Figures 8A, 8B, 8C, 8D:
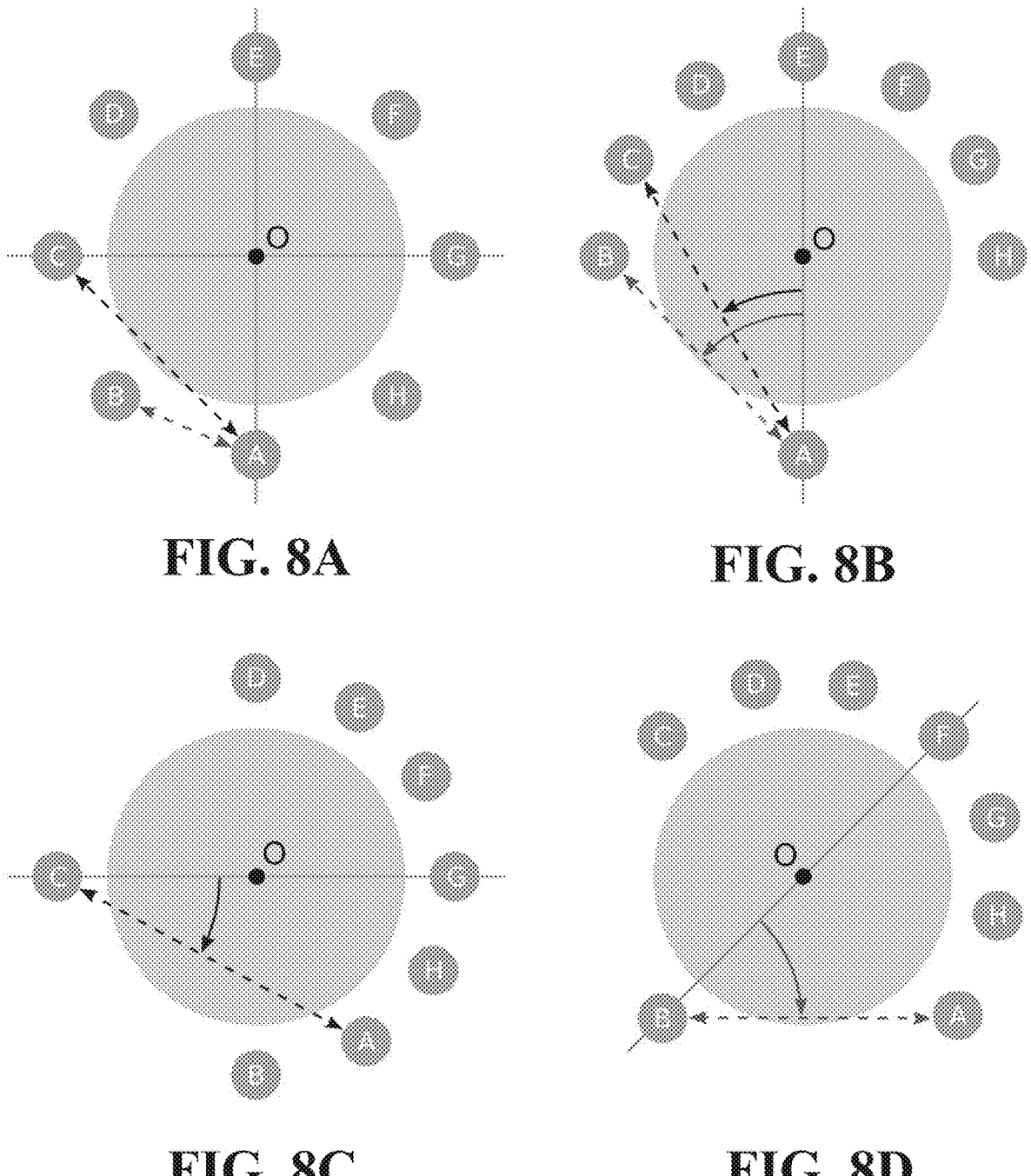
FIGS. 8A to 8D depict a process of shifting virtual positions of conference participants as viewed by different participants, according to an example embodiment.

In FIG. 8A, the virtual positions of a total of eight (8) conference participants A-H surrounding a point O are shown. The order is common to all of the conference participants, and the angular difference between any two adjacent participants is substantially the same in this example. Conference participant A is the observing participant as shown in FIG. 8(a). The virtual position of each conference participant has a similar, if not identical, radius from the point O such that the virtual positions of the eight (8) participants form a circle around the point O. However, it should be understood that in some other examples, the angular difference and radius may vary among the participants. Due to the limited field of view of the 3D display device used by participant A, not all of the remaining participants B-H can be viewed at the same time.

In FIG. 8B, the virtual positions of the remaining participants B-H are shifted toward a region opposite to the virtual position of the observing participant A with respect to the point O. After the shifting, the angular difference between each two adjacent remaining participants B-H with respect to the point O is reduced, but the distribution between participants B and H in terms of the angular difference and the radius may remain in a uniform manner. In this way, the first remaining participant B and the last remaining participant H can be viewed by the 3D display device used by the observing participant A when the field of view allows a horizontal viewing angle of 90 degrees, since $\angle BAH=90°$. It should be understood that the shifting may be performed toward another region, such as the virtual position of an interactive conference participant having eye contact (such as participants B or C, as indicated by the dashed lines in FIG. 8B) with the observing participant A. When conference participant A is talking to conference participant C. they have eye contact. Due to the shifting, the virtual position of conference participant C as viewed by conference participant A moves to the right, and $\angle OAC$ is reduced from about 45° to about 30°. As a result, after the shifting, conference participant A looks at conference participant C slightly to the left of the point O.

Eye contact after shifting can be maintained for different participants if the shifting is performed for corresponding participants, and this phenomenon is further explained by FIGS. 8C and 8D. In FIG. 8C, the observing participant is conference participant C, while conference participants D-H and A-B (clockwise) are the remaining participants. For conference participant C, the remaining participants are shifted correspondingly relative to FIG. 8B, resulting in $\angle DCB=90°$. Since conference participant C is having a conversation with conference participant A as the shifting is performed, the virtual position of conference participant A as viewed by conference participant C moves to the left, and $\angle$OCA is reduced from about 45° to about 30°. As a result, after the shifting, conference participant C looks at conference participant A slightly to the right of the point O, which corresponds to the change when conference participant A is the observing participant. Therefore, $\angle$OAC in FIG. 8B and $\angle$OCA in FIG. 8C are the same, which is due to the conformal geometry, such that the eye contact between conference participants A and C can be maintained.

Similarly, in FIG. 8D, the observing participant is conference participant B, while conference participants C-H and A (clockwise) are the remaining participants. For conference participant B, the remaining participants are shifted correspondingly relative to FIG. 8B, resulting in $\angle$CBA=90°. Since conference participant B is having a conversation with conference participant A as the shifting is performed, the virtual position of conference participant A as viewed by conference participant B moves to the left, and $\angle$OBA is reduced from about 67.5° to about 45°. As a result, after the shifting, conference participant B looks at conference participant A to the right of the point O, which corresponds to the change when conference participant A is the observing participant, as shown in FIG. 8B. Therefore, $\angle$OAB in FIG. 8B and $\angle$OBA in FIG. 8C are the same, which is due to the conformal geometry, such that the eye contact between conference participants A and B can be maintained.

In FIG. 8, a virtual surface may be assigned a size, shape and position so that the virtual positions of the participants surround the periphery of the virtual surface. The virtual surface in this example is a circle, but it may have a different shape, such as a polygon having sides respectively corresponding to the positions of different conference participants (e.g., an octagon when there are eight (8) participants in total). The virtual surface can be displayed by the 3D display device as a table. When a new conference participant joins the conference, the new conference participant is inserted in the order as one of the remaining participants. Then the virtual positions of all remaining participants are updated so that the virtual positions of the remaining conference participants are arranged at substantially equal angular differences with respect to the point O. If the insertion results in overlapping 3D representations, the distance between the virtual positions of the participants may be further increased, although this will make the 3D representations more distant from the observing participant. If the new conference participant is a previous participant who left earlier, the virtual position of the new conference participant may be placed at his or her previous position to provide a more natural transition or shift. On the other hand, when a conference participant leaves the conference, the corresponding virtual position is removed from the order and the other virtual positions of the remaining participants are updated.

Although it is shown in FIG. 8 that the arrangement is performed in two steps (arranging and shifting), it should be understood that the arrangement may be performed in a single step in which the virtual positions are arranged directly to the final results such as shown in FIGS. 8B. 8C, and 8D.

Figures 9A, 9B:
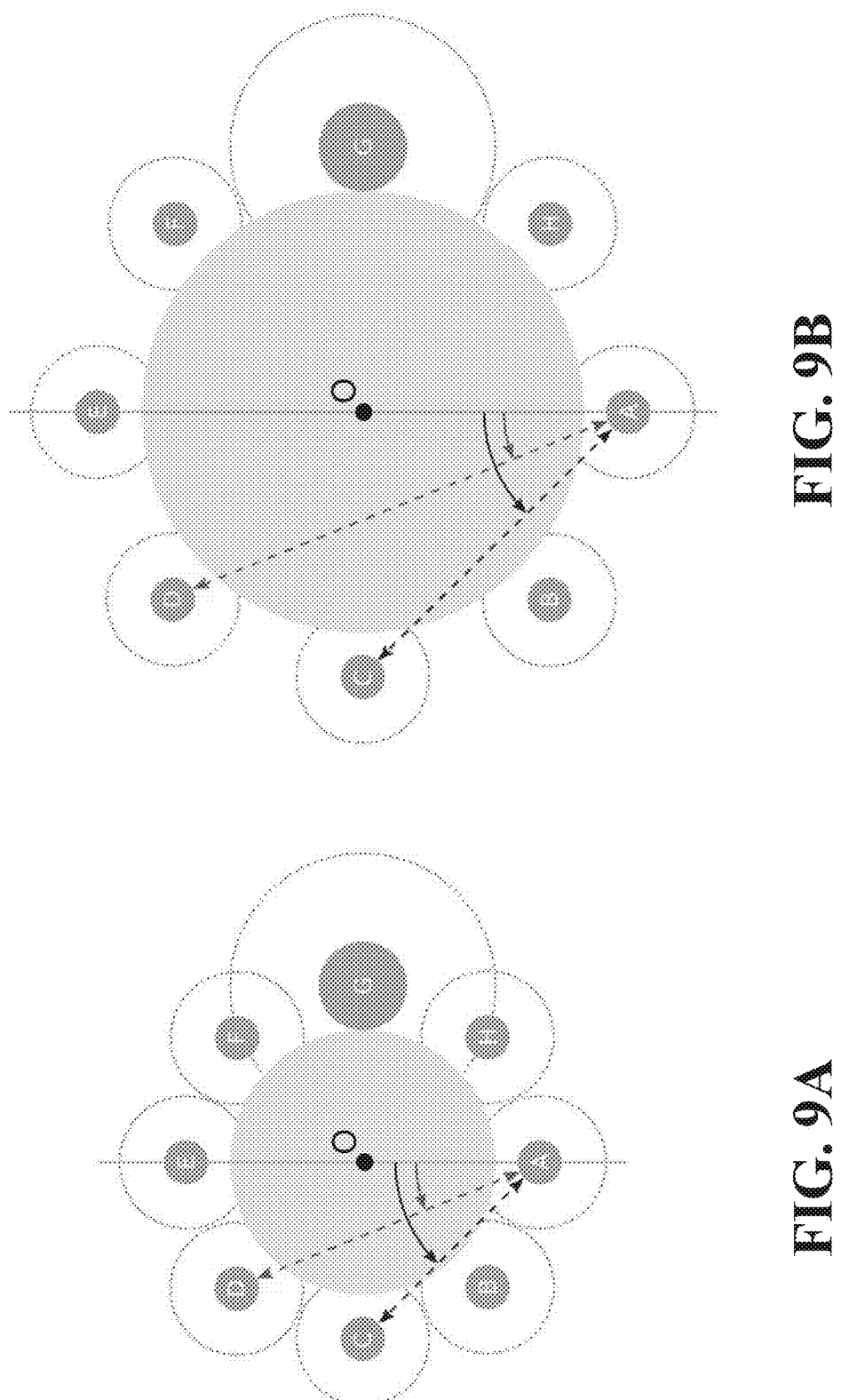
FIGS. 9A to 9B depict a process of scaling a virtual surface according to the size of conference participants, according to an example embodiment.

Referring now to FIGS. 9A and 9B in which a scaling process is illustrated according to an embodiment described herein. In FIG. 9A, the virtual positions of a total of eight (8) conference participants A-H surrounding a point O are shown. The angular difference between any two adjacent participants is substantially the same in this example. Conference participant A is the observing participant as shown in FIG. 9A. The virtual position of each conference participant has a similar, if not identical, radius from the point O such that the virtual positions of the eight (8) participants form a circle around the point O. However, it should be understood that in some other examples, the angular difference and radius may vary among the participants. In this example, participant G is bigger than any of the other participants A-F and H. This may be due to a large or bulky accessory that participant G is wearing or carrying, such as a large hat. As a result, the 3D representation of participant G may overlap with one or both of participants F and H.

In this scenario, the distance between each conference participant and the point O may be increased to such an extent that there is no overlap between any two of the 3D representations of the conference participants. By scaling up the base circle of the cyclic arrangement, additional space is created for the expanded content of the participant's hologram. Importantly, this scaling process adheres to the principles of conformal geometry, ensuring that eye contact angles are maintained regardless of size variations. This allows correct eye contact to be maintained between all participants, further enhancing the realism and interactive potential of the holographic telecommunications experience.

As shown in FIG. 9B, each participant has a greater radius from the point O than in FIG. 9A, while such an increase allows for an unchanged angular relationship due to the conformal geometry. Thus, the gaze or eye contact is not altered in the course of scaling. The virtual surface may be scaled accordingly. Similarly, if there is too much space between the participants, the radius may be reduced to an appropriate extent so that the conference is conducted with a closer distance between the participants without overlapping.

Alternatively, if the 3D representation of one of the conference participants takes up too much space, the angular difference between that participant and two adjacent participants may be larger than the angular difference between the other participants. In this way, the angular differences between the participants are uneven, but allow for a smaller distance from point O.

Offline Browsing

In addition to live call configuration, the disclosed method may be extended to arranging saved (historical) holograms for offline browsing using the same approach. This may be experienced on a 3D display device or via 3D rendering on a 2D display. Although eye contact and gaze direction are less important in offline browsing, it is still beneficial to maintain a consistent user experience with the live session. This consistency makes it easier to apply the same participant density corrections used during the live call setup.

In the offline browsing context, the observer is typically the only active participant. Therefore, all holograms may be oriented to optimize the viewer's experience, regardless of the interactions between the prerecorded holograms. Since these prerecorded holograms lack the ability to autonomously change their gaze or orientation, considerations of eye contact between them become less relevant.

The method may also incorporate ordering of holograms for offline browsing based on various criteria such as assigned names (identifiers), timestamps, metadata, or even visual similarity. In the case of visual similarity, the method may use a variant of the Traveling Salesman Problem (TSP) algorithm applied over hidden features of a deep model over representative frames from each sequence.

An illustrative process may proceed as follows: firstly, a representative frame is selected from the sequence of frames in the hologram animation. This may be the first frame or a frame with desirable attributes, like a forward-looking expression or a smile. Secondly, this frame data is processed by a deep neural network model, such as an Imagenet trained ResNet network or an in-house trained autoencoder network. This process extracts a vector of hidden features from the frame data. The feature extraction may leverage a variety of inputs, such as texture and depth data from the hologram, from the full 3D model, or from rendering the 3D model from a specific angle of view.

To further enrich the process, the method may also incorporate hologram metadata such as recording time, length, facial expression vector, geometric metadata, and so on. This additional data can be incorporated at different stages of the process. A reduced or raw hidden feature vector, possibly post-reduced using Principal Component Analysis (PCA) for efficiency, may then be used as input to the TSP method. The output of this algorithm is an ordered list of holograms based on their similarity, which can be used directly to position the holograms.

For example, for a scenario with 30 holograms of three individuals taken on different occasions, the following steps may be taken: the front view rendering of the first frame of each hologram sequence is exported and fed into the Imagenet ResNet model, resulting in 2048 hidden features for each hologram frame. These 30 resulting vectors are fed into the TSP algorithm to produce an order of holograms in which similar holograms are grouped together.

In addition, for offline browsing of saved holograms, multiple collections may be displayed simultaneously, allowing users to browse one collection at a time while gaining an overview of others. For larger quantities of saved holograms, automatic clustering of holograms may help segment them into manageable collections. To achieve this, the TSP ordering process is retained, but the TSP algorithm is replaced by a clustering algorithm such as the K-means algorithm. The resulting output is a list of sets of similar holograms that can be structured into distinct collections.

It should be understood that the term "hologram" in this context refers to a realistic representation for a conference participant used in the embodiments described herein and should be interpreted in a broad sense. A hologram may be any form of virtual figure, such as a realistic human representation, a parametric human representation (e.g., an avatar), a stereoscopic 3D representation, a volumetric representation, a mesh-based representation, a point-cloud based representation, a radiance field representation, or a hybrid representation. The above embodiments also apply to these other forms of 3D representations because the reconstruction/completion/prediction is capable of enhancing the user experience for any form of 3D representation.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or part of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed sub-stantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is only for the purpose of describing particular embodiments and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

A "computer" or "server" used in the foregoing embodiments may comprise, for example, a processing unit (such as a processor, microprocessor, or programmable logic controller, including when they form part of a central processing unit or graphical processing unit) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory. In at least some example embodiments, a computer may also be embedded in or otherwise comprise part of a device such as a smartphone, tablet, television set, holographic projector, headset, and other similar or analogous devices.

It is contemplated that any part of any aspect or embodiment discussed in this specification can be implemented or combined with any part of any other aspect or embodiment discussed in this specification, unless those parts are mutually exclusive.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:
receiving identifiers of a plurality of conference partici-pants in a virtual conference, wherein at least a three-dimensional (3D) representation of the plurality of conference participants is to be displayed by a 3D display device for one of the plurality of conference participants, and wherein the plurality of conference participants comprises more than three conference par-ticipants including the one of the plurality of confer-ence participants and remaining conference partici-pants; and
determining, for the one of the plurality of conference participants, virtual positions of the plurality of con-ference participants around a point, wherein the deter-mining comprises:
arranging the identifiers of the plurality of conference participants in an order around the point;
determining the virtual positions of the remaining con-ference participants in the order, wherein the virtual positions correspond to 3D representations of the remaining conference participants being within a field of view of the one of the plurality of conference participants viewing with the 3D display device; and
shifting the virtual positions of the remaining confer-ence participants by reducing angular differences between the virtual positions of the remaining con-ference participants with respect to the point, wherein the virtual positions of the remaining con-ference participants are shifted toward a region opposite to the virtual position of the one of the plurality of conference participants with respect to the point or toward the virtual position of an inter-active conference participant having eye contact with the one of the plurality of conference partici-pants.

2. The method of claim 1, further comprising:
providing the virtual positions of the remaining confer-ence participants to a display unit of the 3D display device used by the one of the plurality of conference participants for display.

3. The method of claim 1, wherein the order is common to all of the plurality of conference participants.

4. The method of claim 1, wherein an angle formed by the virtual position of a first one of the remaining conference participants based on the order, the virtual position of the one of the plurality of conference participants, and the virtual position of a last one of the remaining conference participants based on the order is equal to or less than 50 degrees.

5. The method of claim 1, wherein the virtual positions of the remaining conference participants are determined at substantially equal angular differences with respect to the point.

6. The method of claim 1, wherein the virtual positions of the plurality of conference participants are determined at substantially equal distances with respect to the point.

7. The method of claim 6, further comprising determining the substantially equal distances based on sizes of the 3D representations of the remaining conference participants to avoid overlapping of the 3D representations.

8. The method of claim 1, further comprising:
inserting a new conference participant who has joined the virtual conference in the order; and
updating the virtual positions of the remaining conference participants, such that the virtual positions of the new conference participant and the remaining conference participants are spaced at substantially equal angular differences with respect to the point.

9. The method of claim 1, further comprising:
removing a quitting conference participant who has left the virtual conference from the order; and
updating the virtual positions of the remaining conference participants, such that the virtual positions of the remaining conference participants are spaced at sub-stantially equal angular differences with respect to the point.

10. The method of claim 1, further comprising:
generating a size and a position of a virtual surface allowing the virtual positions of the plurality of con-ference participants to surround a periphery of the virtual surface; and
providing the size and the position of the virtual surface to a display unit of the 3D display device, by which the virtual surface is displayed with the 3D representations of the remaining conference participants surrounding the virtual surface.

11. The method of claim 1, further comprising:
for the one of the plurality of conference participants, orienting the 3D representations of the remaining con-ference participants toward the center point; and
providing orientations of the 3D representations of the remaining conference participants to a display unit of the 3D display device.

12. The method of claim 1, wherein the 3D representa-tions of the remaining conference participants are pre-recorded, and the virtual positions of the remaining confer-ence participants are determined according to similarities of the 3D representations of the remaining conference partici-pants.

13. The method of claim 1, further comprising:
clustering a historical collection of the plurality of con-ference participants by a clustering algorithm;
determining the virtual positions of the historical collec-tion of the plurality of conference participants, such that the virtual positions of the conference participants in a same cluster are within a predefined area; and
providing the virtual positions of the historical collection of the plurality of conference participants to a display unit of the 3D display device used by the one of the plurality of conference participants for display.

14. The method of claim 1, wherein the 3D display device is one of an augmented reality (AR) device, a virtual reality (VR) device, a volumetric display device, a holographic projection device, or a light field display device.

15. A system comprising:

at least one network interface;

at least one processor communicatively coupled to the network interface; and at least one non-transitory computer readable medium communicatively coupled to the at least one processor and having stored thereon computer program code that is executable by the processor and that, when executed by the at least one processor, causes the at least one processor to perform a method comprising:

receiving identifiers of a plurality of conference participants in a virtual conference, wherein at least a three-dimensional (3D) representation of the plurality of conference participants is to be displayed by a 3D display device for one of the plurality of conference participants, and wherein the plurality of conference participants comprises more than three conference participants including the one of the plurality of conference participants and remaining conference participants; and determining, for the one of the plurality of conference participants, virtual positions of the plurality of conference participants around a point, wherein the determining comprises:

arranging the identifiers of the plurality of conference participants in an order around the point;

determining the virtual positions of the remaining conference participants in the order, wherein the virtual positions correspond to 3D representations of the remaining conference participants being within a field of view of the one of the plurality of conference participants viewing with the 3D display device; and shifting the virtual positions of the remaining conference participants by reducing angular differences between the virtual positions of the remaining conference participants with respect to the point, wherein the virtual positions of the remaining conference participants are shifted toward a region opposite to the virtual position of the one of the plurality of conference participants with respect to the point or toward the virtual position of an interactive conference participant having eye contact with the one of the plurality of conference participants.

16. The system of claim 15, further comprising a camera communicatively coupled to the processor, the camera for capturing an image of the one of the plurality of conference participants.

17. The system of claim 15, wherein the 3D display device is communicatively coupled to the processor, and wherein the method further comprises displaying the 3D representations of the remaining conference participants on the 3D display device according to the arranged positions.

18. At least one non-transitory computer readable medium having encoded thereon computer program code that is executable by at least one processor and that, when executed by the at least one processor, causes the at least one processor to perform a method comprising:

receiving identifiers of a plurality of conference participants in a virtual conference, wherein at least a three-dimensional (3D) representation of the plurality of conference participants is to be displayed by a 3D display device for one of the plurality of conference participants, and wherein the plurality of conference participants comprises more than three conference participants including the one of the plurality of conference participants and remaining conference participants; and determining, for the one of the plurality of conference participants, virtual positions of the plurality of conference participants around a point, wherein the determining comprises:

arranging the identifiers of the plurality of conference participants in an order around the point;

determining the virtual positions of the remaining conference participants in the order, wherein the virtual positions correspond to 3D representations of the remaining conference participants being within a field of view of the one of the plurality of conference participants viewing with the 3D display device; and shifting the virtual positions of the remaining conference participants by reducing angular differences between the virtual positions of the remaining conference participants with respect to the point, wherein the virtual positions of the remaining conference participants are shifted toward a region opposite to the virtual position of the one of the plurality of conference participants with respect to the point or toward the virtual position of an interactive conference participant having eye contact with the one of the plurality of conference participants.

* * * * *